United States Patent Office.

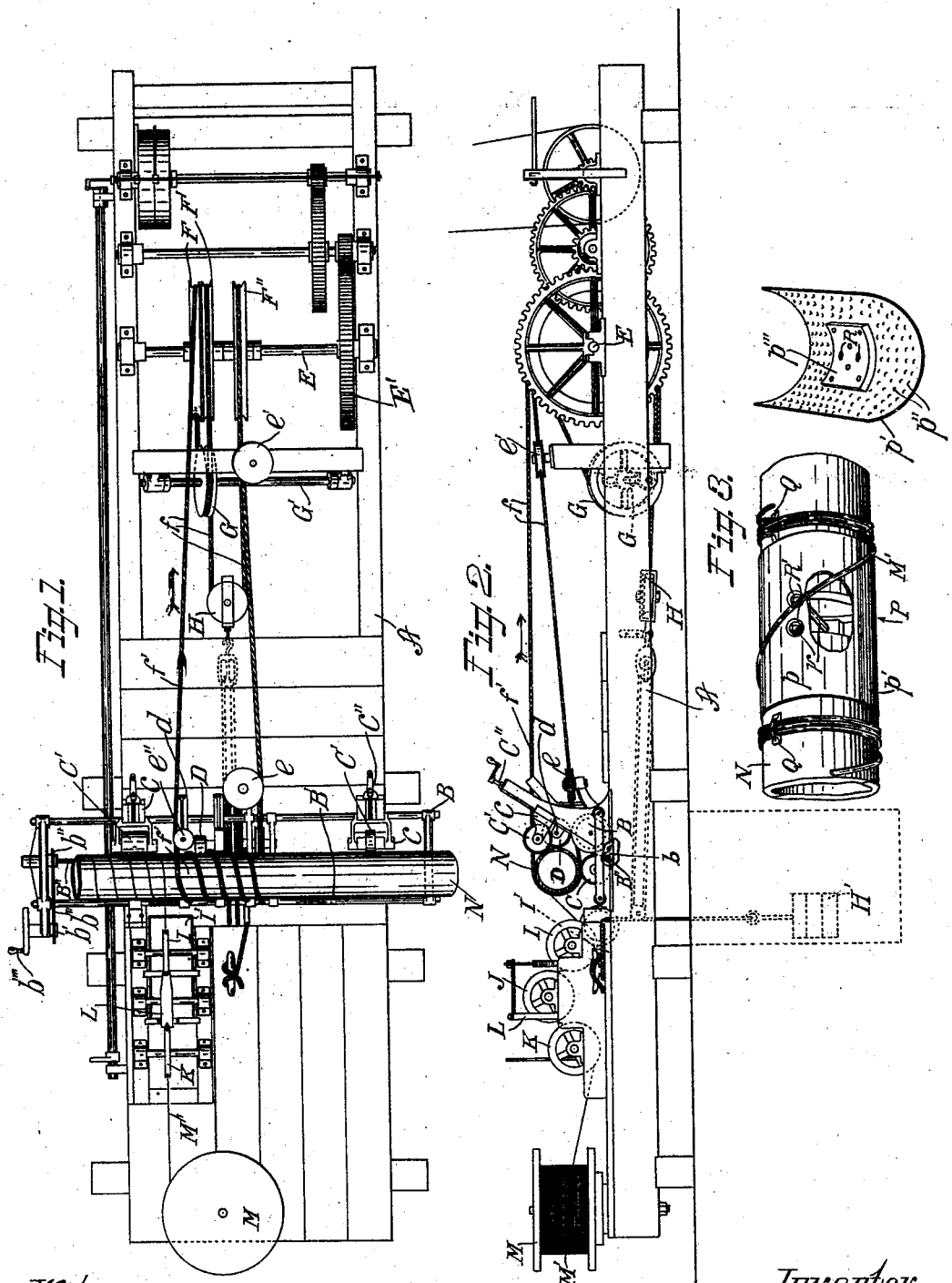

WALTER J. WOODWARD, OF NATIONAL CITY, CALIFORNIA, ASSIGNOR TO HATTIE I. WOODWARD, OF SAME PLACE, AND D. P. N. LITTLE, C. W. SANDERS, AND EMMA A. HARRINGTON, OF LOS ANGELES, CALIFORNIA.

WOODEN-PIPE-BANDING MACHINE.

SPECIFICATION forming part of Letters Patent No. 603,392, dated May 3, 1898.

Application filed February 15, 1897. Serial No. 623,541. (No model.)

*To all whom it may concern:*

Be it known that I, WALTER J. WOODWARD, a citizen of the United States, residing at National City, in the county of San Diego and State of California, have invented new and useful Improvements in Pipe-Banding Machines, of which the following is a specification.

The particular object of my invention is to produce a machine which will be capable of successful use in banding wooden pipe made from sections of boards bent into form by a machine for which Henry E. Brett and myself have, by an application, Serial No. 623,560, of even date herewith, applied for Letters Patent of the United States, and for which pipe I have, by an application, Serial No. 623,542, of even date herewith, applied for Letters Patent of the United States.

The especial object of my invention is to produce means whereby wooden pipe may be continuously fed through a machine and firmly compressed by subjecting it to pressure applied spirally along the pipe and continuously increasing from the point at which the pipe is first subjected to pressure to the point at which it is relieved from such pressure, so that thereby the pipe is gradually compressed to the greatest possible degree and perfect closure of the joints secured. Immediately after passing from the compressing device the pipe is wrapped with a wrapping of wire or other suitable material, which is also applied spirally under tension, so that when the pipe is completed and passes from the machine it is so tightly compressed and so firmly wrapped that there is no liability of leakage of the joints even when subjected to high pressure and before the fibers become saturated and expand.

There are many difficulties in the way of successfully wrapping wooden pipe by machinery. I first endeavored to wrap single lengths of pipe by placing the pipe in a lathe and applying power to one end of the pipe to rotate it while winding it spirally with wire. This proved impracticable in that the tension upon the wrapping caused the pipe to twist, so that each seam or joint between the sections was a spiral, starting in on one side of the pipe and ending on the other side. I then applied power to both ends of the pipe while wrapping it and found the seams were bow-shaped. I also found it impossible to compress the pipe sufficiently by winding the wire about it, for the reason that the wire is of comparatively small diameter, that used upon a six-inch pipe being but one-quarter inch in diameter, and when high tension was placed upon it rupture of the outer fibers of the wood was produced without giving adequate compression to the pipe.

I have found in experimenting that it is practically impossible, when the wire wrapping is first started, to secure sufficient tension upon the permanent wrapping of wire which is used to hold the pipe in place until several turns have been taken about the pipe. By my improved wrapping-machine I compress the pipe preliminarily by means of a traveling spiral band, which also operates to feed the pipe forward, so that unless provision is made therefor the wire wrapping is applied to the pipe in spirals corresponding to the spirals of the compressing-band, which is wrapped about the pipe. Since the pipe must rotate and also travel forward while rotating, it becomes very difficult to wrap the pipe with a sufficient number of coils to gain the desired tension upon the wrapping until the pipe, by the operation of the compressing-band, has traveled ahead to bring the wrapping a considerable distance from the end of the pipe. This proves a serious difficulty, since it leaves that end of the pipe to which the wrapping is first applied without a sufficient tension upon the wrapping to prevent the pipe from leaking under pressure. Tension must also be gained upon the compression-band, and this also necessitates several preliminary turns of the pipe. I also found that I could not wrap the rear end of each pipe-section sufficiently tight, since as the pipe passed forward, fed by the spiral compression-band, the spirals of the band were one by one released from the end of the pipe and the tension thereby relaxed, so that sufficient compression could not be gained. Since a pipe is no stronger than its weakest point, this difficulty was one of great magnitude, since if it was attempted to use the entire length of pipe having loosely-wrapped ends the efficiency of the pipe was greatly reduced. I overcome this objection by cutting off a portion of each end of the pipe, using only the central portion, which was sufficiently compressed and tightly enough wrapped to withstand high pressure. This, however, was very expensive, since the cost of the material required to produce a certain length of pipe was greatly in excess of what it should be. I also found considerable difficulty in placing the various lengths of pipe in the machine, it being necessary to release the tension upon the compression-band and to wrap the band properly spaced spirally around the end of the pipe.

Another object of my invention is to provide an improvement in the processes of banding wooden pipe which enables me to avoid the objections heretofore set forth and to apply a uniform tension upon the wire wrapping from one end of the pipe to the other and to continuously feed the sections of pipe into the machine without releasing the tension upon the compression-band or the wire wrapping.

The accompanying drawings illustrate my invention.

Figure 1 is a plan view of a machine embodying my invention. Fig. 2 is a side elevation of the same. Fig. 3 is a longitudinal fragmental section showing two pipe-sections secured together with my improved tension-clamp.

In the drawings, A represents a main frame upon which the entire mechanism is mounted. B represents a compression-band-carrying frame which, by means of slides B', is arranged to be adjusted transverse the main frame.

B'' is a screw-shaft journaled in the adjustable frame and screwed through a nut b, secured to the main frame. This shaft is operated by means of sprocket-wheels b' b'', sprocket-chain b''', and a crank b''''. By rotating the crank the screw is screwed into and out of the nut and carries the adjustable frame back and forth transverse the main frame.

C represents pipe-supporting wheels journaled upon the main frame and adapted to support the pipe N while it is being compressed and wrapped.

C' represents antifriction pipe-guiding wheels adapted to engage the pipe upon one side and to allow the pipe to easily turn while being compressed and banded. These wheels are mounted in an adjustable frame c, operated by means of screw-shafts C'', whereby the position of the wheels may be regulated to suit the size of the pipe being banded.

D is a bearing-wheel which is mounted upon the frame B and engages the pipe and receives the direct pull of the compressing-band and is by any suitable means, such as the brackets d and clamps, rendered adjustable to suit the size of pipe being supported.

In the main frame and at one side of the adjustable frame B is journaled a power-shaft E, to which is fixed a driving-wheel E', which is connected through suitable intermediate gears with a power. (Not shown.) Upon this power-shaft is fixed a band-driving wheel F. An idle-wheel F' is journaled to freely revolve upon the shaft. A band-transferring wheel G is journaled in the frame at one side of the two main band-wheels and has its axis or shaft G' arranged at an angle with the axis of the driving-shaft E, so that the band f will feed from the lower side of the driving-wheel F onto the lower side of the transferring-wheel G and will feed from the upper side of the transferring-wheel onto the idle-wheel F'. A second idle-wheel F'' is journaled upon the driving-shaft, and the driving-band f, which is preferably made of a cable of manila or other fibers not so firm and unyielding as to crush the pipe, is trained around the power-wheel F, the transferring-wheel G, the idle-wheel F', thence around a pulley H back to the idle-wheel F'', under which it passes, thence forward to the pipe-carrying frame, where it is spirally wound around the pipe, as clearly shown in Fig. 1. The driving-wheel F and the idle-wheel F'' are arranged a suitable distance apart to give the desired number of turns spirally around the pipe. A tension-weight H' is secured to the block or pulley H by suitable intermediate means and adapted to hold the driving-band taut. Guide drums or sheaves e e' are arranged to guide the cable from the idle-wheel F'' to the point where it winds upon the pipe. The wheel e'' guides the cable from the pipe to the driving-wheel F. The wheels e e'' are secured to the adjustable frame B.

I, J, and K are tension-wheels, around which passes the wire M' to be wrapped upon the pipe. The wheel I revolves in a bath I', which is preferably filled with asphaltum, so as to coat the wire with asphaltum before it is wound about the pipe. A brake L is arranged to control the movements of the tension-wheels and to give the desired tension to cause the wire to partially bed itself in the wood of the pipe, but not sufficient to rupture or break the fibers. The brake may be of any of the well-known forms commonly employed for banding pipes with wire, and detailed illustration herein is not necessary for a complete understanding of my invention.

M is a reel upon which is wound the wire M', which passes around the tension-wheels I, J, and K and is wrapped about the pipe.

In operating my machine a section of pipe N is placed in the machine upon the adjustable frame B, and the compressing band or cable f is wound spirally about the pipe, as shown in Fig. 1. The tension may be removed from the band while this winding is being accomplished. Then the tension is applied and power is actuated to rotate the driving-shaft E to carry the band in the direction indicated by the arrows, thereby unwinding the band from the advance portion of the pipe and winding it upon the rear portion. By reason of the power being applied to the advance member $f'$ of the band $f$ the greatest compression takes place at the point where the cable leaves the pipe, and the cable at the point where it winds upon the pipe is under comparatively low tension, and this tension gradually increases to the point where the cable leaves the pipe, where, as stated, it is greatest. This gradual compression is in effect the same as would be that of driving the pipe into a tapering passage, except that the spiral application of the power avoids friction and the sections of pipe are tightly compressed and firmly wedged together with slight expenditure of power. When the end of the pipe has advanced to a point opposite the tension-wheel I, the end of the wire M' is secured to the pipe, and as the pipe is rotated by the driving-band and thus driven ahead the adjustable frame B, which carries the rope-guiding sheaves $e\ e''$, is, by rotating the screw-shaft B'', carried to the rear, so that the spirals of the band are wrapped upon the pipe without causing the pipe to travel forward, thus holding the pipe stationary with relation to the wire-wrapping device. Ordinarily I prefer to take three parallel turns of wire about the end of the pipe, and as soon as this is done I reverse the motion of the screw-shaft to carry the adjustable frame back to its normal position, the tension upon the cable causing it to follow the sheaves $e\ e''$, and to feed the pipe forward care must be taken that this reverse movement is slow and uniform, lasting from one fastening to the other; otherwise the windings of wire upon the pipe will be unequally spaced. When the frame is returned to its normal position, the rotation of the driving-band forces the pipe through the machine, the pipe sliding spirally along upon the supporting-wheels C and C'. The thrust-wheel D is arranged upon the adjustable frame and follows the movements of the cable to take the direct pull of the cable or tension-band and to thereby avoid breaking the pipe in two.

I have found in practice that it is practically impossible with my method of compressing the pipe, by means of a band spirally wound about the pipe, to gain sufficient tension upon the front end of the section first entered. For this reason I have devised a process of winding whereby after the front end of the first section is wound I am enabled to keep the tension uniform from one end of each section to the other.

In practicing this process after one section has been started into the machine and almost completely wound I secure a second section to the end of the first section by means of removable clamps P. Then when the end of the first section is reached I make the parallel turns, as heretofore described, preferably seating them in a clip Q, having malleable lugs and which is described and claimed by me in an application of even date herewith for patent upon wooden pipes. After these turns are made, as hereinbefore described, the direction of travel of the movable frame is reversed as suddenly as possible, allowing the cable to feed the pipe rapidly forward, and the wire is carried at an obtuse angle across the joint between the two sections, after which the frame is operated to form the coils about the end of the second section. Then the motion of the frame is reversed to return it to its normal position and to give a uniform spiral to the wrapping. When the end of the second section is reached, a third section may be attached to the second section and the banding made continuous from end to end, after which the machine may be stopped, the wrappings secured upon each side of each joint between the sections, the wire wrapping cut between the fastenings, the temporary clamps removed, and the sections separated from each other. It will be understood that the tension is maintained upon the wire wrapping while this is being done. As soon as the wrapped sections are fastened and removed from the front end of the pipe unwrapped sections are secured in succession and the operation made continuous. By this means the tension is made uniform from one end of each section to the other, and in practice I have at one time had in my machine three sixteen-foot sections of completely-wrapped pipe, with one section of unwrapped pipe secured in place ready to be fed into the machine.

The strain upon the adjustable clamps P is excessive, and it is essential that they hold the pipe-sections firmly in place. It is also essential that they be so tightly seated upon the pipe as to not yield under the pressure of the band $f$. The clamps which I have devised and used for this purpose each consist of two approximately semicircular members $p\ p'$, each roughened or provided upon its inner face at each end with points $p''$, adapted to take into the wood of the pipe. In order that these points be firmly seated in the wood, it becomes necessary that great pressure be exerted upon the clamps. It is also essential that the plates of which the clamps are made be not so thick as to increase the diameter of the pipe unduly at the joint. In order to make the clamps thin, but still secure the required strength, I reinforce each clamp by a steel plate $p'''$, riveted to each section at its mid-length and upon the inside thereof. Screw-threaded bolt-holes R are provided in one member, and countersunk bolt-holes R' are provided in the other member, and clamp-bolts $r$ are passed through the bolt-holes R' and screwed into the bolt-holes R. A socketwrench is used to operate the bolts to draw the two members firmly down upon the pipe. The screw-threaded and countersunk bolt-holes are centrally arranged at the mid-length of the members, and the bolt which fastens the members together passes from one member to the other through the axis of the cylinder formed by the two members when thus held together. By this method the bolts fasten the members together perfectly, and there are no protuberances to interfere with the winding of the cable.

It will be seen that by my method of banding the compression of the band gradually increases from the point at which it is wrapped upon the pipe to the point at which it leaves the pipe, so that the compression is made gradual and uniform and is extremely effective without being liable to crush the pipe. I have found it possible by increasing the tension upon the band to cut the pipe in two, and in practice with my machine I use a cable of one and three-eighths inches in diameter, and this cable leaves perceptible marks upon the pipe after it has been banded. The tension upon the wire wrapping is made sufficiently great to partially embed the wire in the wood, the compression of the fibers beneath the wire while dry causing them to expand as soon as they become wet, thus aiding in making the wrapping extremely tight and preventing the opening of any of the joints.

Now, having described my invention, what I claim as new, and desire to secure by Letters Patent, is—

1. In a pipe-banding machine, the combination of means for removably securing together, axially, end to end, independent sections of pipe; means for compressing and rotating the pipe thus secured together; means for applying a continuous band to the compressed pipe; and means for maintaining a tension on the band.

2. A pipe-machine comprising a frame; an endless band adapted to have a portion of its length wound spirally around a length of pipe; guide-wheels for the band; a tension for the band; a bearing-wheel adapted to support the pipe against the pull of the band; means for driving the band; and a wrapping device adapted to wrap the pipe as it is released from the band.

3. In a banding-machine, the combination set forth of a frame; an endless band adapted to be wound spirally around a pipe; suitable guiding-wheels for the band; a bearing-wheel adapted to take the pull of the band; a tension for holding the band taut; means for driving the band; and a wrapping device adapted to wrap the pipe with a permanent wrapping as it is released from the band.

4. In a pipe-banding machine, the combination set forth of a main frame; pipe guiding and supporting wheels arranged upon the main frame; band driving and guiding wheels secured in the frame at one side of the pipe guiding and supporting wheels; a compression and driving band trained around the guiding and supporting wheels, and adapted to be wound spirally around a pipe arranged upon the supporting and guiding wheels; a tension device adapted to hold the band taut; and a wire-wrapping device adapted to wrap the pipe as it is released from the spiral compression and driving band.

5. In a banding-machine, the combination set forth of a main frame; pipe-carrying wheels arranged on the main frame; a band-shifting frame arranged on the main frame and adapted to be adjusted transverse such frame; pipe guiding and supporting wheels arranged on the main frame; suitable band driving and guiding wheels arranged in the main frame at one side of the adjustable frame; an endless band trained around such wheels and adapted to be wound spirally about a pipe arranged upon the pipe-carrying wheels; a tension device for holding the band taut; means for driving the band; a wrapping device adapted to wrap the pipe as it is released from the traveling band; and suitable means for adjusting the band-adjusting frame.

6. In a banding-machine, the combination set forth of a main frame; a compressing band-carrying frame arranged to be adjusted transverse the main frame; pipe supporting and carrying wheels arranged upon the main frame; means for adjusting the band-carrying wheels; band driving and guiding wheels arranged at one side of the adjustable frame; an endless band trained around the driving and guiding wheels and adapted to be wrapped spirally about a pipe arranged upon the pipe-carrying wheels; means for driving the band; means for wrapping the pipe as it is released from the band; and means for adjusting the adjustable frame.

7. A banding-machine comprising an endless cable having a portion of its length adapted to be spirally wound about a pipe; means for driving the band to rotate the pipe and to cause it to travel forward; a wrapping device for wrapping the pipe; and means for adjusting the band to cause it to feed the pipe axially forward or to remain stationary with relation to the wrapping device while rotating.

8. In a pipe-banding machine, a clamp for holding the ends of the pipe-sections together and comprising two approximately semicircular members each roughened upon its inner face at each end with points adapted to take into the wood of the pipe, and screw-bolts centrally arranged at the mid-length of the members to hold them together.

9. In a pipe-banding machine, a clamp for holding the ends of the pipe-sections together and comprising two plates to fit upon the outside of the pipe and provided with points to take into the pipe and respectively reinforced at the mid-length, and screw-bolts centrally arranged and passing through the reinforced portion to draw the members together.

10. In a pipe-banding machine, a clamp for holding the ends of the pipe-sections together and comprising two approximately semicircular members to fit upon the outsides of two sections of pipes, one member being provided with a screw-threaded bolt-hole, and the other member with a countersunk bolt-hole; and a clamp-bolt passed through the countersunk bolt-hole and screwed into the screw-threaded bolt-hole and passing through the axis of the cylinder formed by the two members while thus held together.

WALTER J. WOODWARD.

Witnesses:
 ALFRED I. TOWNSEND,
 JAMES R. TOWNSEND.